United States Patent
Feinstein

(10) Patent No.: US 11,190,562 B2
(45) Date of Patent: *Nov. 30, 2021

(54) GENERIC EVENT STREAM PROCESSING FOR MACHINE LEARNING

(71) Applicant: Intuit Inc., Mountain View, CA (US)

(72) Inventor: Efraim Feinstein, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,785

(22) Filed: Jun. 9, 2020

(65) Prior Publication Data
US 2020/0304550 A1    Sep. 24, 2020

Related U.S. Application Data

(63) Continuation of application No. 16/017,275, filed on Jun. 25, 2018, now Pat. No. 10,715,570.

(51) Int. Cl.
*H04L 29/06* (2006.01)
*H04L 29/08* (2006.01)
*G06N 3/04* (2006.01)
*G06N 3/08* (2006.01)

(52) U.S. Cl.
CPC ....... *H04L 65/4069* (2013.01); *G06N 3/0445* (2013.01); *G06N 3/08* (2013.01); *H04L 67/141* (2013.01)

(58) Field of Classification Search
CPC ............... H04L 29/08072; H04L 29/06; H04L 29/0809; H04L 29/08117; G06Q 30/02
USPC .......................................................... 709/219
See application file for complete search history.

(56) References Cited

U.S. PATENT DOCUMENTS

| | | | | |
|---|---|---|---|---|
| 8,880,697 B1* | 11/2014 | Liu | ..................... | G06Q 30/0255 709/225 |
| 2008/0270322 A1* | 10/2008 | Cooper | .................. | G06Q 40/06 705/36 R |
| 2012/0309428 A1* | 12/2012 | Marti | .................... | G01S 5/0278 455/456.5 |
| 2019/0197435 A1* | 6/2019 | Kobayashi | ............. | G06N 20/00 |

* cited by examiner

*Primary Examiner* — Hermon Asres
(74) *Attorney, Agent, or Firm* — Ferguson Braswell Fraser Kubasta PC

(57) ABSTRACT

A method includes establishing a network connection with a source computing device and an application services computing device, receiving, via the network connection, a source event stream at the application services computing device, and extracting a sample of the source event stream. The method further includes partitioning the sample of the source event stream into fields, identifying a field data type of a field of the multiple fields in the sample, identifying a distribution of values of the field in the sample, and extrapolating, from the sample of the source event stream, extrapolated functions for the fields. Extrapolating an extrapolated function is dependent on the field data type and the distribution of the field. The method further includes transforming, based on the plurality of extrapolated functions in the configuration file, the source event stream to obtain a transformed event stream, and analyzing, by a target machine learning model, the transformed event stream.

20 Claims, 12 Drawing Sheets

GENERIC EVENT STREAM PROCESSING FOR MACHINE LEARNING

CROSS REFERENCE TO RELATED APPLICATIONS

This application is a continuation of U.S. patent application Ser. No. 16/017,275, filed Jun. 25, 2018. Accordingly, this application claims benefit under 35 U.S.C. § 120 to U.S. patent application Ser. No. 16/017,275. U.S. patent application Ser. No. 16/017,275 is incorporated herein by reference in its entirety.

BACKGROUND

Software applications provide different types of functionality. While some software applications are directed to the end user (e.g., word processing applications, web browsers, etc.), other software applications are directed to systems management. Systems management manages the underlying computing systems that execute the end user software applications. For example, systems management includes monitoring and controlling various hardware and software on the various computing devices in a network.

One technique used by systems management is with respect to the creation and analysis of event streams. Event streams are streams of events created by a computing system. For example, an event may capture an action of the software or hardware executing on the computing system. While event streams are useful in understanding how the computing system is used, detecting failures and intrusions, and performing other tasks, an event stream produces large volumes of data for analysis. When multiple event streams exist, the large volumes are magnified.

SUMMARY

In general, in one aspect, one or more embodiments relate to a method that includes establishing a network connection with a source computing device and an application services computing device, receiving, via the network connection, a source event stream at the application services computing device, and extracting a sample of the source event stream. The method further includes partitioning the sample of the source event stream into fields, identifying a field data type of a field of the multiple fields in the sample, identifying a distribution of values of the field in the sample, and extrapolating, from the sample of the source event stream, extrapolated functions for the fields. Extrapolating an extrapolated function is dependent on the field data type and the distribution of the field. The method further includes transforming, based on the plurality of extrapolated functions in the configuration file, the source event stream to obtain a transformed event stream, and analyzing, by a target machine learning model, the transformed event stream.

In general, in one aspect, one or more embodiments relate to a system. The system includes a hardware processor and memory, and software instructions stored in the memory, which when executed by the hardware processor, cause the hardware processor to perform operations. The operations include establishing a network connection with a source computing device and an application services computing device, receiving, via the network connection, a source event stream at the application services computing device, and extracting a sample of the source event stream. The operations further includes partitioning the sample of the source event stream into fields, identifying a field data type of a field of the multiple fields in the sample, identifying a distribution of values of the field in the sample, and extrapolating, from the sample of the source event stream, extrapolated functions for the fields. Extrapolating an extrapolated function is dependent on the field data type and the distribution of the field. The operations further includes transforming, based on the plurality of extrapolated functions in the configuration file, the source event stream to obtain a transformed event stream, and analyzing, by a target machine learning model, the transformed event stream.

A non-transitory computer readable medium comprising computer readable program code for performing operations. The operations include establishing a network connection with a source computing device and an application services computing device, receiving, via the network connection, a source event stream at the application services computing device, and extracting a sample of the source event stream. The operations further includes partitioning the sample of the source event stream into fields, identifying a field data type of a field of the multiple fields in the sample, identifying a distribution of values of the field in the sample, and extrapolating, from the sample of the source event stream, extrapolated functions for the fields. Extrapolating an extrapolated function is dependent on the field data type and the distribution of the field. The operations further includes transforming, based on the plurality of extrapolated functions in the configuration file, the source event stream to obtain a transformed event stream, and analyzing, by a target machine learning model, the transformed event stream.

Other aspects of the disclosure will be apparent from the following description and the appended claims.

DETAILED DESCRIPTION

Figure 1A:
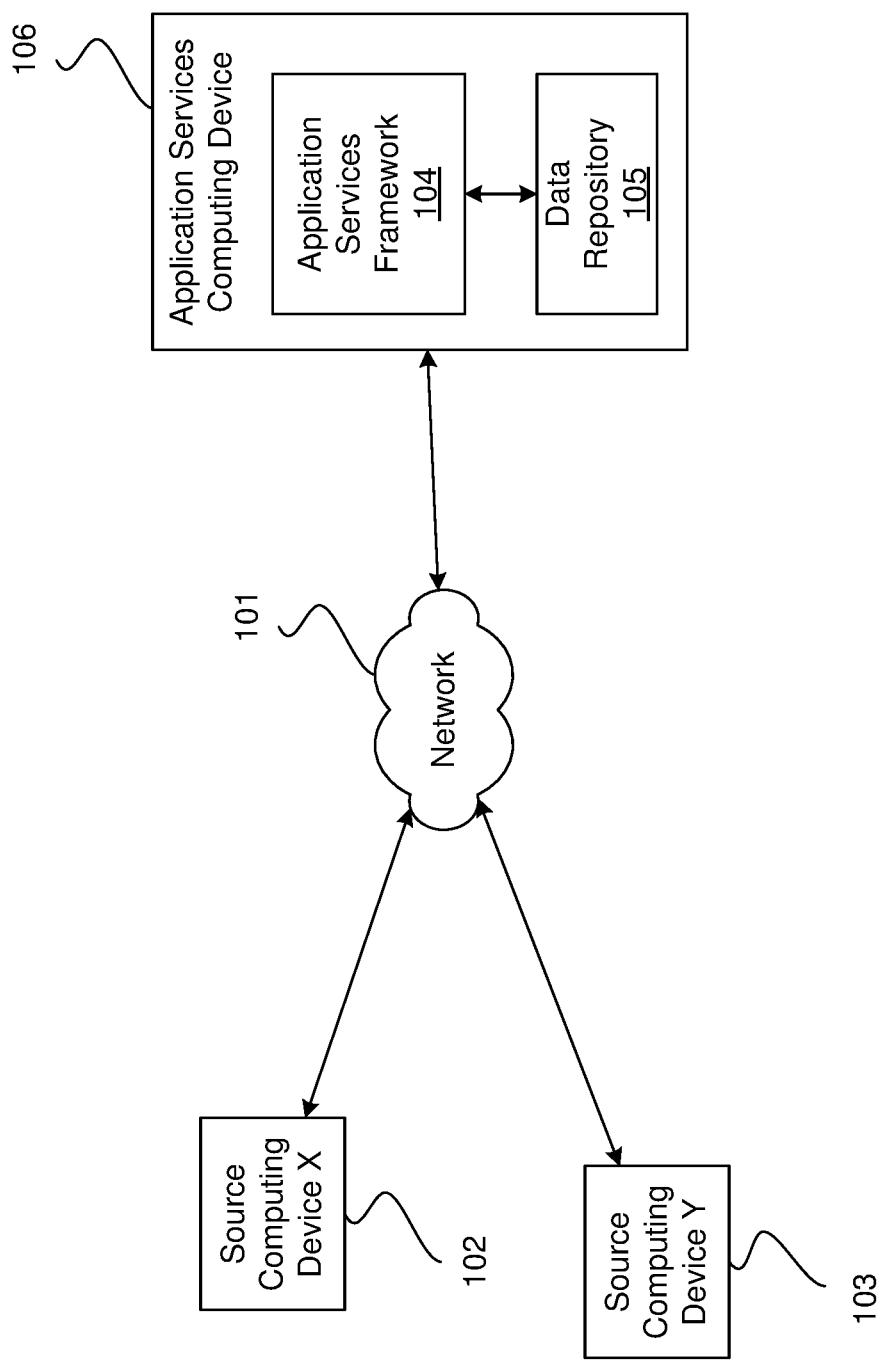
FIG. 1A is a network diagram in accordance with one or more embodiments.

Specific embodiments of the present disclosure will now be described in detail with reference to the accompanying figures. Like elements in the various figures are denoted by like reference numerals for consistency.

In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Many data sources generate event streams, such as records of login events or clickstreams. When data arrives from a stream, the data may have a schema that is determined entirely by a generic use case (e.g., just having a record of the transactions) or by the business use case from the stream (e.g., directly analyzing clicks), but not for any particular result from a machine learning algorithm. The data that is recorded, of necessity, is very close to the workings of the product. Further, the data schema for an event stream can be quite varied. For example, the data may arrive in an analytics environment as a structured relational database or the data may be a largely unstructured JAVASCRIPT® Object Notation (JSON) blob (JAVASCRIPT® is a registered trademark of Oracle America, Inc. located in Redwood Shores, Calif.). The schemata of the event streams often includes hundreds of elements. Each of the elements has a unique interpretation. However, the interpretation with respect to a specific analytics exercise is often not known in advance when using the dataset for machine learning.

Many machine learning algorithms expect input data to be in a consistent form. For some algorithms, only numeric data is accepted, for others, streams of letters may be accepted. For others, encoded words may be accepted. The columns in event streams are in inconsistent forms and are therefore unsuitable for direct insertion as features in machine learning algorithms.

One or more embodiments is a process for converting a generic event stream into a machine-learning ready form where the data elements can be included as inputs to the target machine learning model. This process improves over existing technology. Time series analysis literature assumes that the time series will be numeric. Much of the challenge of handling arbitrary event streams, such as those captured in logs and databases, is in encoding the data to make it ready for machine learning. This process eliminates that step in favor of a generic process.

One or more embodiments of the present disclosure involve a process for converting a source event stream into field strings that are meaningful to machine learning algorithms. The process receives a source event in real time or near real time. The process extracts a sample of the source event stream and partitions the sample into fields. The process extrapolates an extrapolated function for each of the fields and stores the extrapolated function in a configuration file. Then, the process applies the stored extrapolated functions to the event stream to create a transformed field event stream, which is input to machine learning algorithms.

FIG. 1A is a network diagram in accordance with an example embodiment. As depicted in FIG. 1A, source computing devices (e.g., source computing device X (102), source computing device Y (103)) are connected via a network (101) to an application services computing device (106). The network (101) may be a wide area network (WAN) including the Internet, which might be wireless in part or in whole. The computing devices (e.g., source computing device X (102), source computing device Y (103), application services computing device (106)) in FIG. 1A may be the same or similar to the computing systems discussed below with reference to FIG. 4A and FIG. 4B.

The source computing devices (e.g., source computing device X (102), source computing device Y (103)) include functionality to generate events and transmit events streams. The event stream as received from the source computing device is referred to as a source event stream. An event is an action that is recorded by a computing device. For example, an event may be a selection of a graphical user interface (GUI) widget, the receiving of a packet by a network interface card, opening of a software application, a detection of a fault, or another action involving a device. Various components of the source computing devices may be configured to generate events. Further, events may be first recorded on the source computing device or received by the source computing device. For example, events may be recorded on other devices and transmitted to the source computing device. In the example, software/hardware agents on the other devices may send the events to a central monitoring system on the source computing device.

Events in the source event stream each include a collection of fields having field values. A field value is value of a field that has a single piece of information about the event. For example, a field may be an attribute of the event. Example fields includes device identifier, timestamp, type of event, result of event, and other attributes of the event. Events from the same device may be concatenated into a source event stream in one or more embodiments. In some embodiments, events generated by multiple devices may be concatenated into a source event stream.

A source event stream is a series of events. Source event streams may be structured or unstructured. Structured event streams have a defined structure within the event stream. For example, the defined structure may be fields with attribute value pairs. The delimiters may be between fields and events. Unstructured event streams do not have a defined structure within the source event stream. For example, the unstructured event stream may be a series of values without attribute names. Each value in the source event stream may correspond to a field. The attribute corresponding to the value may be defined based on the location of the value and/or the format of the value. Unstructured and structured event streams may follow a schema. The schema defines the ordering and format of fields in the source event stream.

For example, a source event stream may be a clickstream emanating from an online application. As another example, the source event stream might emanate from a third party, e.g., a stream of financial transactions emanating from a financial institution. The source event stream might be (a) historic (e.g., captured in a database or log file) or (b) real time or near real time.

The source computing devices are communicatively coupled to the application services computing device (106). The application services computing device (106) is a computing device that includes functionality to process source event streams. The application services computing device (106) includes a data repository (105) and an application services framework (104).

The data repository (105) is any type of storage unit or device that includes functionality to store data. For example, the data repository (105) may be a file, memory, database, or other data storage structure or device, that includes functionality to store data. For example, the data may include the source event stream and information extracted from source event streams.

The application services framework (104) is hardware, software, and/or firmware that includes functionality to extract an extrapolated function for fields in events in the source event stream. The application services framework may further include functionality to process the source event streams using the extrapolated functions. Specifically, the application services framework (104) includes functionality to transform a source event stream based on the extrapolated functions in order to process the source event stream through one or more machine learning algorithms.

Figure 1B:
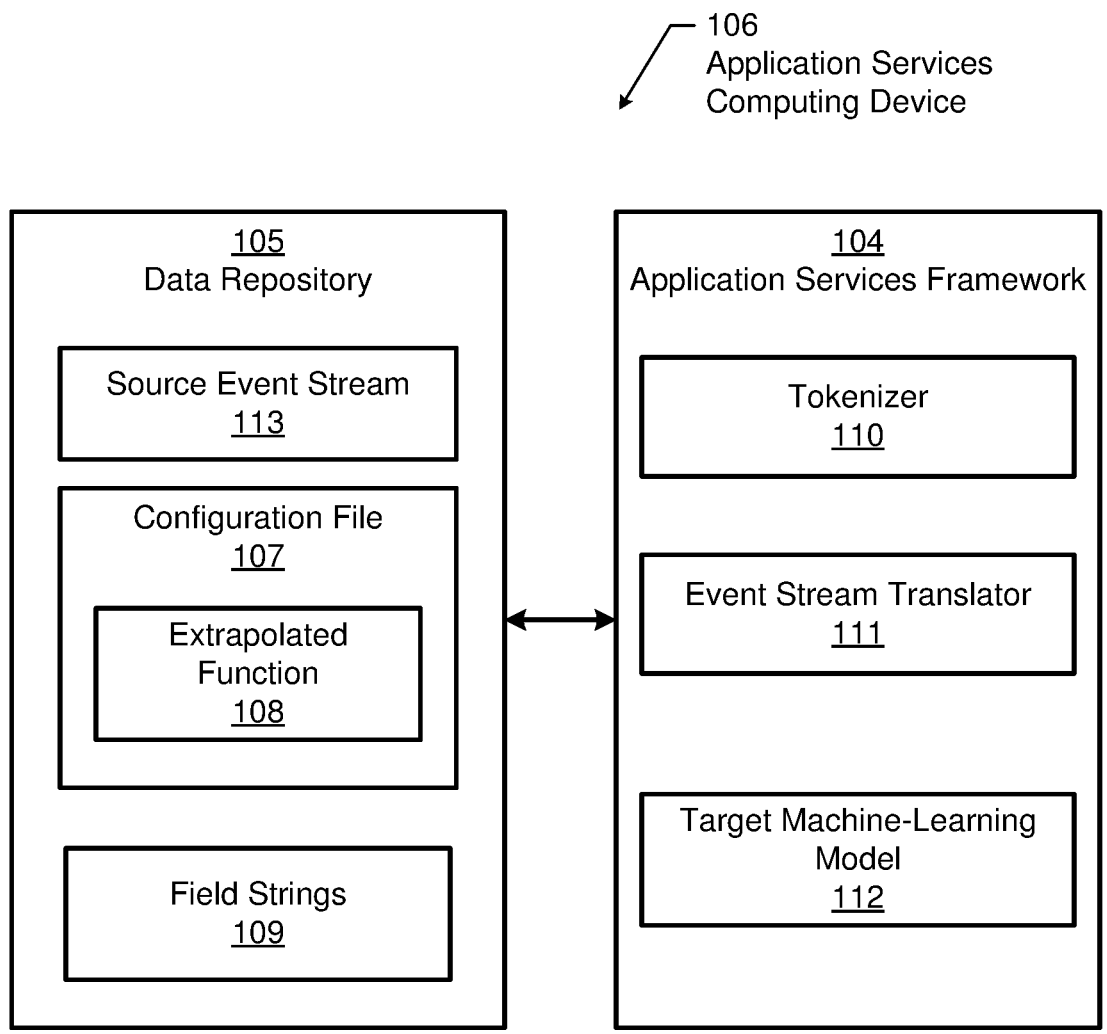
FIG. 1B is a diagram showing a system in accordance with one or more embodiments.

FIG. 1B shows a more detailed diagram of the applications services computing device (106) in accordance with one or more embodiments. As shown in FIG. 1B, the application services computing device (106) includes a data repository (105) and the application services framework (104). The data repository (105) and the application services framework (104) in FIG. 1B may be the same or similar as the data repository (105) and the application services framework (104) described above with reference to FIG. 1A.

As shown in FIG. 1B, the data repository (105) includes functionality to store temporarily or permanently, in whole or in part, a source event stream (113). The source event stream is an event stream from a source computing device. The data repository may receive multiple source event streams concurrently. The data repository (105) may also include functionality to store a configuration file (107).

The configuration file (107) is a file or part of a file that defines configuration parameters for processing a source event stream (113). The configuration parameters define a transformation on the source event stream. In one or more embodiments, the configuration file (107) is defined for each source event stream (113). In one or more embodiments, the configuration parameters include an extrapolated function (108). The extrapolated function (108) is a function creating a new value having a different data type and is extrapolated from a predefined data type of the field. For example, the predefined data type may correspond to an elementary data type along with the possible values that may be assigned to the elementary data type for the field. For example, elementary data type may be byte, string, float, Boolean, etc. The possible values that the elementary data type may be assigned may be time based values, address based values, values on a continuous range, enumerated values, etc. Because the predefined data type incorporates the possible values that may be assigned to the elementary data type, the predefined data type is more specific than the elementary data type. The extrapolated function is extrapolated or derived from the predefined data type. For example, the extrapolated function may define a transformation of the predefined data type. The transformation makes the values more useful to a machine learning algorithm to accurately predict information from the event streams. By way of an example, from a predefined data type corresponding to address, the extrapolated function defines how to extrapolate parts of the address (e.g., city, state, host name, geological location of a server, etc.). As another example, if the predefined data type is a time in a first format, the extrapolated function defines how to transform the time into a second format that is different from the first format. FIGS. 2B and 2C, discussed below, present various transformations that may be performed to generate extrapolated functions.

The data repository (105) further includes functionality to store field strings (109). A field string (109) is a value created by the extrapolated function. In one or more embodiments, the field string (109) is a transformed value generated by applying the extrapolated function to one or more fields in the source event stream (113). In other words, if the extrapolated function is a time in a certain format, the field string is the value of the time in the format.

The data repository (105) is communicatively connected to the application services framework (104). Specifically, the connection is the medium by which the application services framework (104) may obtain data from the data repository (105). For example, the connection may be a bus. The application services framework (104) includes a tokenizer (110), an event stream translator (111), and a target machine learning model (112).

The tokenizer (110) includes functionality to parse the source event stream (113) and partition the source event stream into fields. The event stream translator (111) includes functionality to extract a sample of the source event stream and generate a set of extrapolated functions from the sample. The event stream translator (111) further includes functionality to translate a remainder of the source event stream into field strings based on the extrapolated functions.

The target machine learning models (112) are machine learning models that are configured to analyze the field strings (109) and extract information based on the analysis. For example, the target machine learning models (112) may be an artificial neural network, a classifier, a nearest neighbor or other greedy model. The information extracted by the target machine learning models may be to detect anomalies in a network (e.g., for network intrusion detection), detect improper use of software, detect a fault of hardware in a computer network component or to perform another action.

Figure 1C:
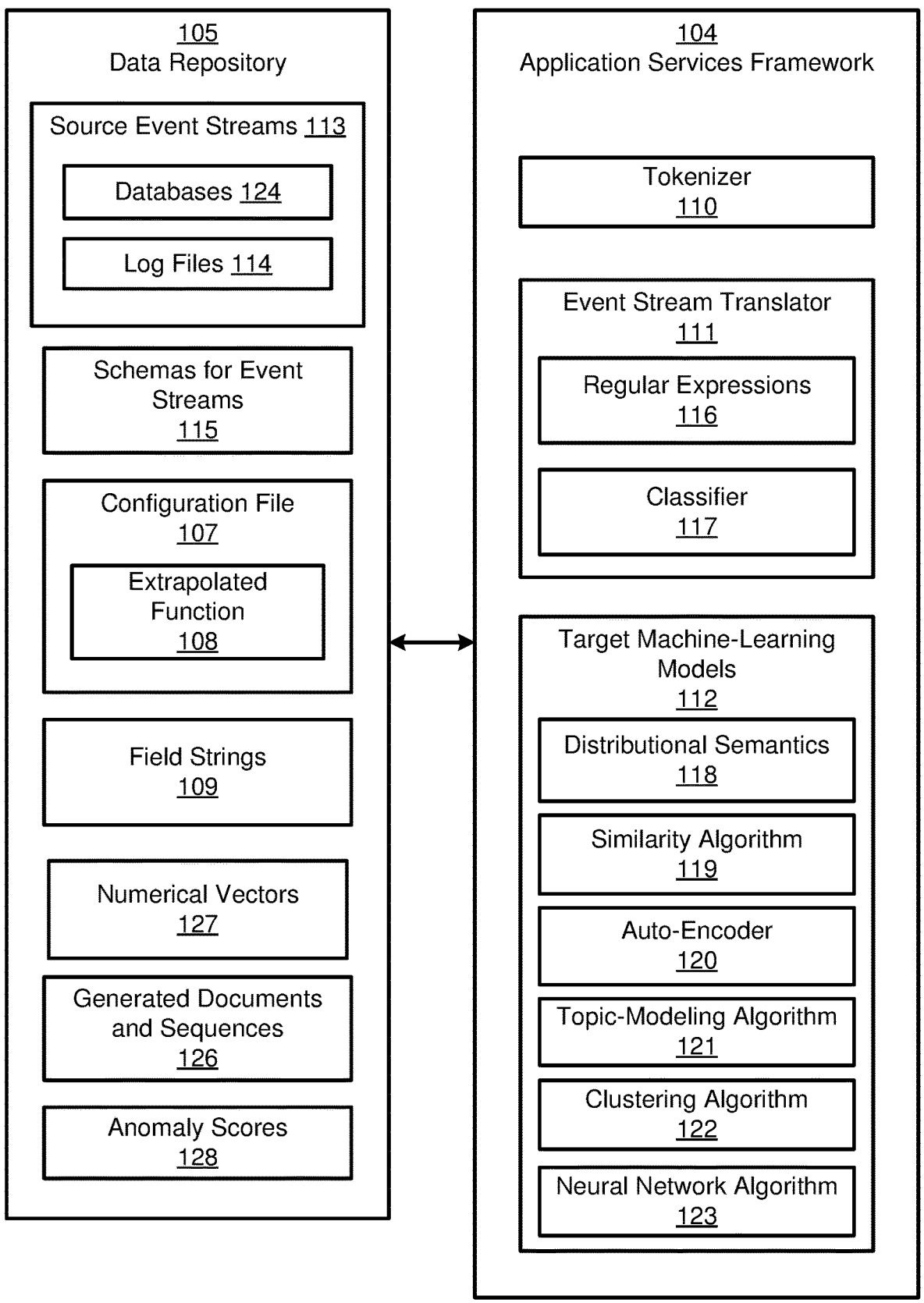
FIG. 1C is a diagram showing a system in accordance with one or more embodiments.

In at least some embodiments, the data repository (105) and the application services framework (104) may include additional components. FIG. 1C is a diagram showing additional components of the data repository (105) and the application services framework (104) in accordance with one or more embodiments.

The application services framework (104) might host an online application (not shown) that is massively multi-user. In one or more embodiments, the online application might be a financial application that allows a user to perform operations on the user's financial transactions through commands entered in a graphical user interface (GUI) displayed by the online application. These operations might be recorded in databases (113) and log files (114) in data repository (105), as clickstreams, along with other data related to a user's use of the online application, e.g., data related to any networks that a user used to access the online application.

As shown in FIG. 1C, the source event streams (113) may have data stored in databases (124). Specifically, the data may be partitioned into records. Each record may have attribute values for corresponding attributes. For example, each record may correspond to an attribute value for a corresponding attribute. Each attribute value is a field of the source event stream and each record is an event in one or more embodiments. Thus, the database is a structured source event stream having attribute value pairs.

By way of another example, the source event stream (113) may include log files (114). Log files (114) store series of events whereby each subsequent event is appended at the end of the log file. An example of a log is a JSON log. Thus, as new events are received, the new events may be added to the end. The log files may be structured or unstructured. For example, log files may have attribute name, attribute value pairs for each attribute of the event. As another example, log files may include only attribute values.

Data repository (105) also stores schemas (115) for source event streams. In one or more embodiments, such schemas describe the attribute names used in databases (124) and/or the ordering or denotation of attribute values in log files (114). In one or more embodiments, the source event streams described by schemas (115) might be processed: (a) periodically, e.g., hourly, daily, weekly, etc., in batch; and/or (b) in real time.

Alternatively, as described above, the schema for the source event stream (e.g., a source event stream received in real time or near real time) might not be known or provided to the application services framework (104). In such a scenario, the tokenizer may be configured to extract the schema based on a sample from the source event stream.

Data repository (105) also stores a configuration file (107) that contains a collection (108) of extrapolated functions (108). The configuration file (107), the extrapolated functions (108), and field strings (109) may be the same as or similar to the corresponding configuration file (107), the extrapolated functions (108), and field strings (109) described above with reference to FIG. 1B.

The data repository further includes functionality to store numerical vectors (127), generated documents and sequences (126), and anomaly scores (128). A numerical vector (127) is a vector having only numerical values that represent information. For example, a numerical vector may be a one hot encoded vector. The numerical vectors may be generated using distributional semantics.

As used in this disclosure, "distributional semantics" is to be broadly construed to mean a trained distributional-semantic model. In distributional semantics, vector space models (VSMs) represent (embed) words in a continuous vector space where semantically similar words are mapped to nearby points ('are embedded nearby each other. VSMs depend on the Distributional Hypothesis, which states that words that appear in the same contexts in a text corpus (e.g., all the webpages in Wikipedia) share semantic meaning. The different approaches that leverage this principle can be divided into two categories: count-based methods (e.g. Latent Semantic Analysis or LSA), and predictive methods (e.g., neural probabilistic language models). Count-based methods compute the statistics of how often some word co-occurs with its neighbor words in a large text corpus, and then map these count-statistics down to a small, dense vector for each word. Predictive models directly try to predict a word from its neighbors in terms of learned small, dense embedding vectors (considered parameters of the model). In one or more embodiments, the values in the numeric vectors might be numeric measures of counts or predictions.

Word2vec is a particularly computationally-efficient predictive model for learning word embeddings from raw text in a text corpus which might be large. It comes in two flavors, the Continuous Bag-of-Words model (CBOW) and the Skip-Gram model (204). Algorithmically, these models are similar, except that the CBOW model predicts target words (e.g. 'mat') from source context words ('the cat sits on the'), while the Skip-Gram model does the inverse and predicts source context-words from the target words. This inversion turns out to be a useful thing for smaller datasets. However, the CBOW model treats each context-target pair as a new observation and tends to do better with larger datasets. In one or more embodiments, distributional semantics might use the Skip-Gram model, because the online application is massively multi-user. Also, in one or more embodiments, distributional semantics (118) might be trained on a corpus consisting of a collection of databases and/or logfiles.

Generated document and sequences (126) are groupings of field strings that are related to a common value. For example, the common value may be an external identifier that is referenced in the source event stream. The external identifier may be a user identifier that is not present in the events and referenced by the events. For example, an account may have an account number that is separately associated with a user identifier. By way of an example, the common value may be a user identifier. The generated document and sequences (126) may include events from multiple source computing devices. In other words, the generated document and sequence may have events from a variety of source event streams.

Anomaly scores (115) are each a value assigned to a source event stream by a target machine learning model indicating a degree at which the source event stream indicates the presence of an anomaly. The anomaly score is the probability that an anomaly exists based on the source event stream. The anomaly score may be specific to the type of anomaly (e.g., intrusion has a first anomaly score, a network failure has a second anomaly score), and/or may be specific to the device. Thus, an event stream may be assigned multiple anomaly scores. In one or more embodiments, the anomaly score is assigned on a scale, whereby one side of the scale indicates that no anomaly exists, and the other side of the scale indicates a certainty that the anomaly exists. For example, the anomaly score may be indicative of fraud.

Continuing with FIG. 1C, the application services framework (104) includes a tokenizer (110), an event stream translator (111), and target machine learning model (112). The tokenizer (110), an event stream translator (111), and target machine learning model (112) may be the same or similar to the tokenizer (110), an event stream translator (111), and target machine learning model (112) in FIG. 1B.

In one or more embodiments, the event stream translator (111) includes regular expressions (116) and classifier (117). The regular expressions (116) map fields (e.g., column or attribute values, as opposed to column or attribute names) to the field strings (109) defined by the extrapolated functions. In other words, the regular expressions include functionality to identify whether a field complies with an input string and map the field to an output string.

Additionally, or alternatively, a trained classifier (117) might map fields to the field strings (109) defined by extrapolated functions. For example, the classifier (117) might be a predictive classifier. A predictive classifier is classifier that predicts the probability an input M is in a class N, using a trained predictive model such as naïve Bayes, logistic regression, random forest, gradient boosting machine, etc. The predictive classifier might be binomial (e.g., there are only two classes) or multinomial (e.g., there are more than two classes). In one or more embodiments, the predictive classifier might be provided by a public cloud, rather than application services framework (104).

Continuing with FIG. 1C, the target machine-learning models (112) may include distributional semantics (118), (b) similarity algorithm (119), (c) autoencoder (120), topic-modeling algorithm (121), (e) clustering algorithm (122), and (f) recurrent neural-network algorithm (123).

FIGS. 2A, 2B, 2C, 3A, 3B, 3C, 3D, and 3E are flowcharts of a process for deriving and using extrapolated functions from a source event stream, in accordance with one or more embodiments. While the various operations in these flowcharts are presented and described sequentially, one of ordinary skill will appreciate that some or all of the operations might be executed in different orders, might be combined or omitted, and some or all of the operations might be executed in parallel. Furthermore, the operations might be performed actively or passively. For example, some operations might be performed using polling or be interrupt driven in accordance with one or more embodiments of the present disclosure. By way of an example, determination operations might not require a processor to process an instruction unless an interrupt is received to signify that condition exists in accordance with one or more embodiments of the present disclosure. As another example, determination operations might be performed by performing a test, such as checking a data value to test whether the value is consistent with the tested condition in accordance with one or more embodiments of the present disclosure.

Figure 2A:
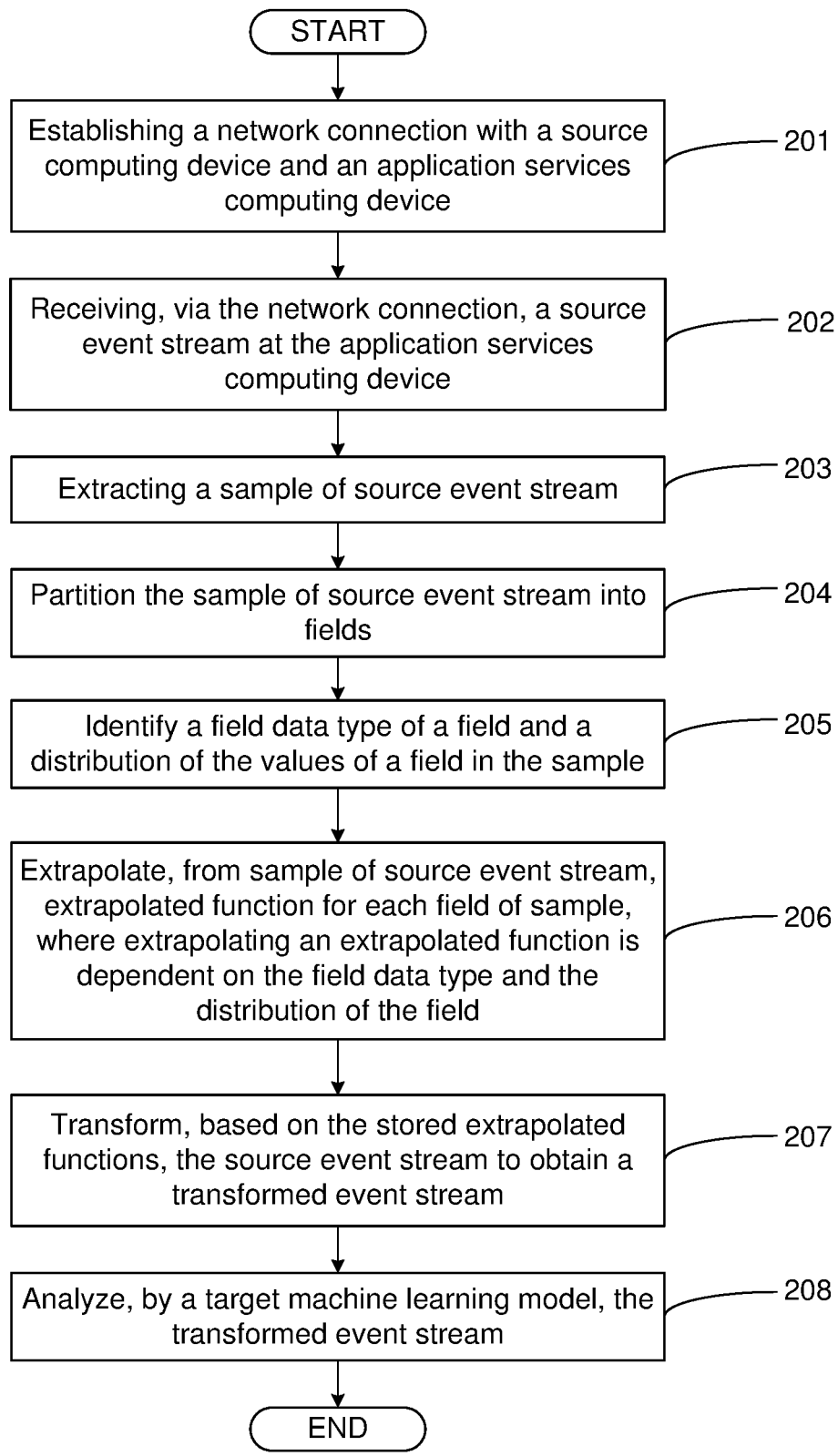
FIG. 2A is a flowchart diagram of a process for deriving and using extrapolated functions from an event stream, in accordance with one or more embodiments.
Figure 2B:
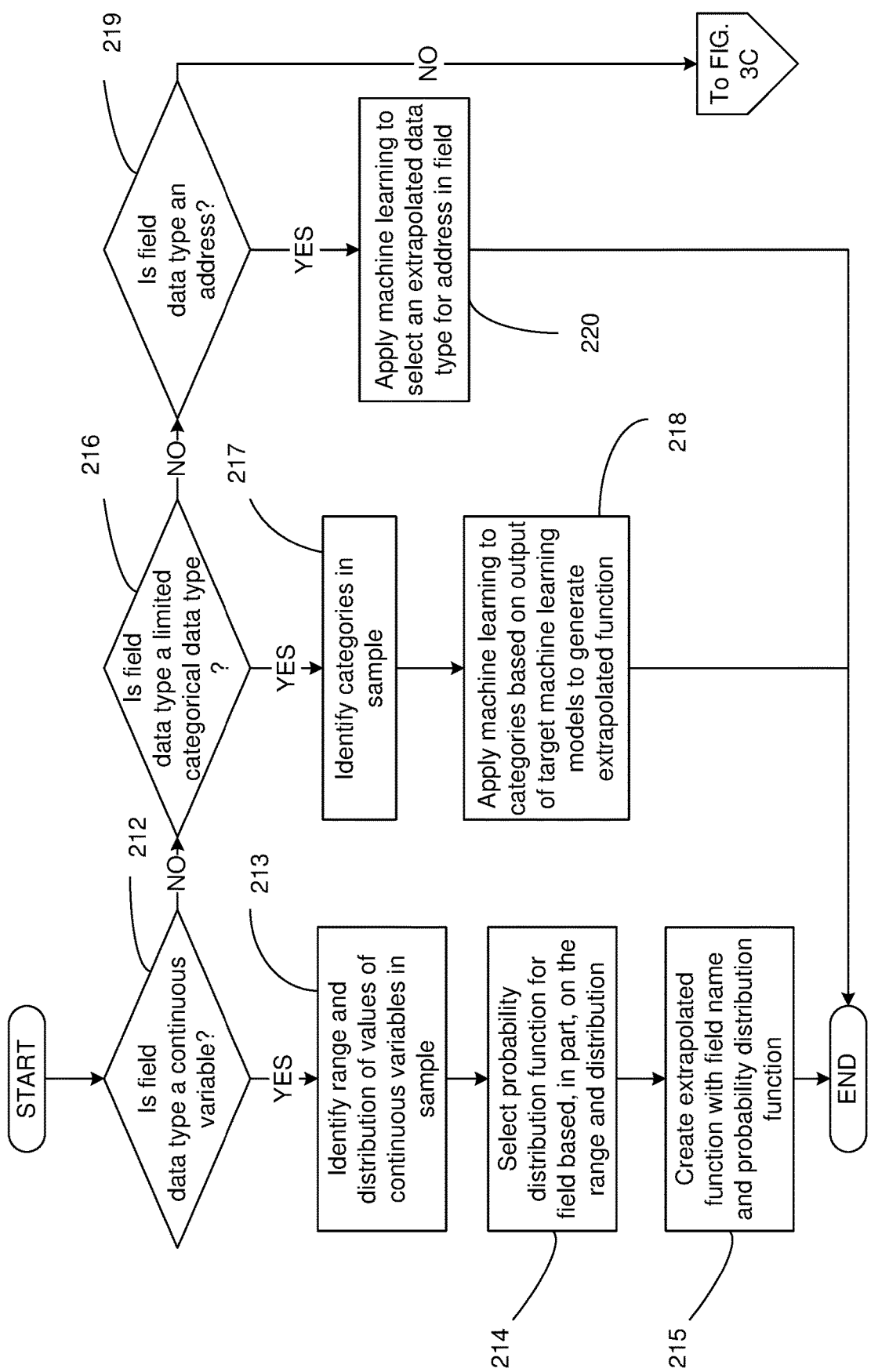
FIGS. 2B and 2C are a flowchart diagram of a process in accordance with one or more embodiments.
Figure 2C:
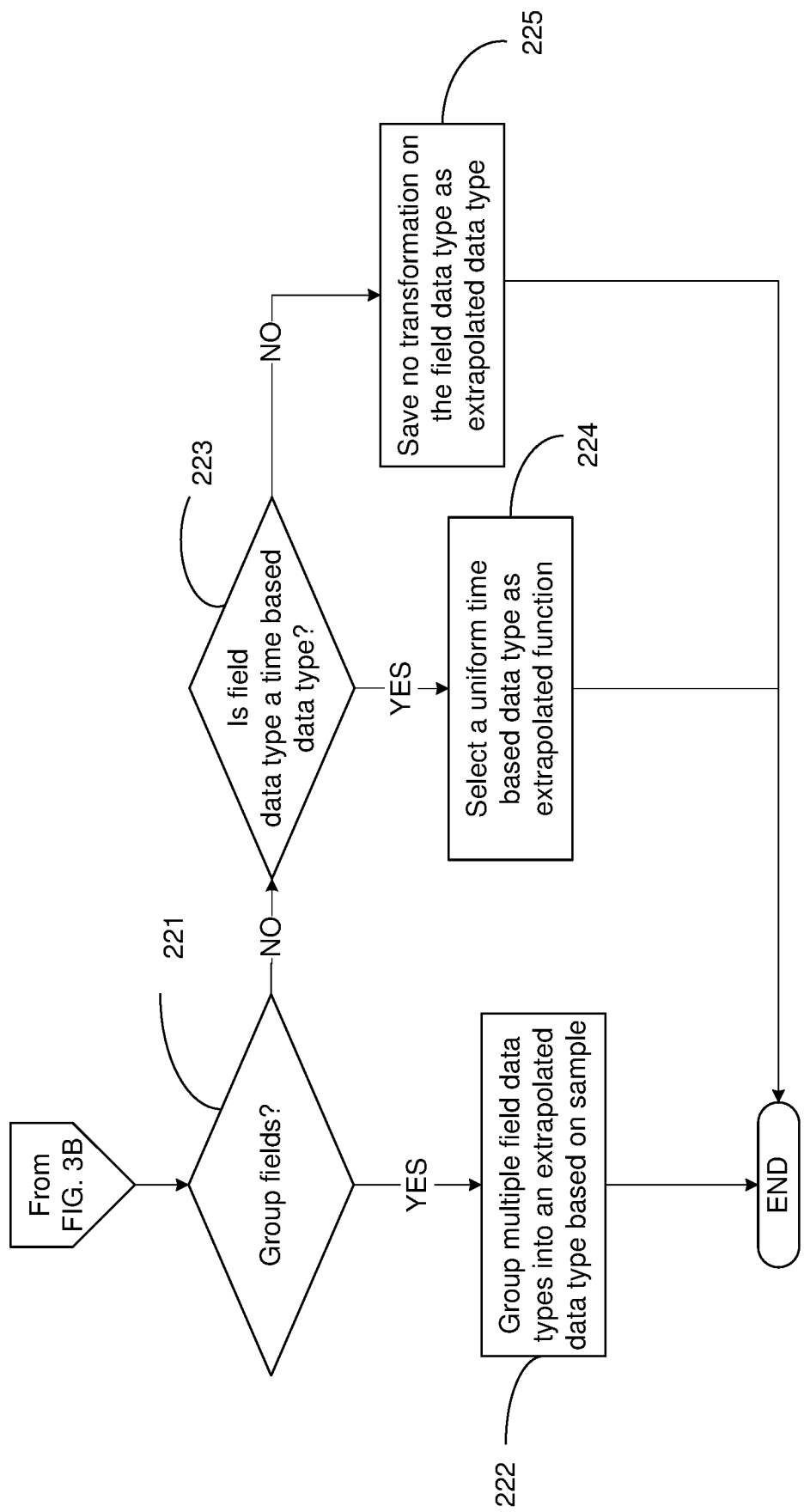

As depicted in FIG. 2A, in operation 201, a network connection is established with a source computing device and an application services computing device. Software (e.g., the software executing on the application services computing device and the source computing devices) establishes a network connection. The network connection creates a session between the computing devices through one or more intermediate devices. The network connection may be via a virtual private network. Packets of the source event stream may be sent via one or more network devices between the source computing device and the application services framework on the application services computing device.

In operation 202, via the network connection, a source event stream is received at the applications services computing device. In some embodiments, the source event stream is received and processed in real time. In other words, as the source event stream is received, the source event stream is processed through the application services frameworks including being analyzed by the target machine learning models. Thus, abnormalities and other results are determined as the source event stream is being received. In some embodiments, the source event stream is received, and batch processing is performed.

In operation 203, a sample of the source event stream is extracted. For example, the sample may be a predefined amount of the event stream, such as the initial N number of events of the source event stream. The N number of events may be defined based on the number of bytes of the source event stream. In one or more embodiments, samples are periodically extracted from the source event stream. For example, the sample may be the N number of events extracted every M number of events.

In operation 204, the sample of the source event stream is partitioned into fields. Delimiters in the source event stream may be used to divide the sample into events and divide the events into fields. As another example, the headers or a selection of rows may partition into samples.

In operation 205, a field data type of a field and a distribution of the values of the field in the sample are determined. Matching values of the sample are values that belong to the same field. In other words, the fields that match each other (e.g., correspond to the same attribute of data in the event stream). For example, matching values may be in the same column or have the same attribute name. For example, the matching values may have the name "source_IP_address." The matching values may be in the same position with respect to the event. For example, the matching values may be the fifth field in the event. From the matching values, the field data type (i.e., predefined data type) is determined. Classifiers and/or regular expressions may be applied to determine the field data type.

The matching values are extracted and analyzed as a group. The analysis of the group is used to identify the distribution of the fields in the group. For example, based on the group, the system may determine whether the values of the field are continuous or discrete, whether the values of the field are all within a small set of values, whether the values of the field are naturally clumped into ranges, such as have a normal distribution around a mean, or other information about the distribution of the fields. To identify the field data type and the distribution, various techniques may be used. Below is an example of a few techniques.

For example, regular expressions may be used. Regular expressions are rules that define an input sequence and an output. If a value satisfies the input sequence, then the result is specified by the output. For the input, the regular expression specifies an ordering of character types. Thus, to determine whether the value satisfies the input sequence, each character in the value is compared to a corresponding location in the regular expression to determine whether the character in the value is the character type of the corresponding location. In one or more embodiments, the process is performed for each value in the group of matching values. If the regular expression is satisfied, then the output of the regular expression may be the predefined data type specified by the regular expression. If the regular expression is not satisfied, the next regular expression may be analyzed with the group.

Another technique may be to apply a predictive classifier to the field. The predictive classifier may perform a statistical analysis on the values in the group to determine the defined data type of the field. For example, the classifier may determine a distribution of the values of the field.

In Step 206, from sample of source event stream, extrapolated function for each field of sample is extrapolated, where extrapolating an extrapolated function is dependent on the field data type and the distribution of the field. In some embodiments, the regular expression specifies function that defines a transformation of the matching fields. The transformation is the extrapolated function for the field.

If, of the possible values of a defined data type, the majority of the values are within a narrow distribution, then the extrapolated function may be a function that maps values to within the narrow range. If a wide range exists, the extrapolated functions may be a function to map the field values to buckets. The predictive classifier is trained to perform an analysis of the distribution to determine the defined data type and the extrapolated function.

Another example technique may be to use a transformation machine learning model that is trained based on one or more metrics of the target machine learning model to select the extrapolated function. The metric may be accuracy and efficiency of the target machine learning model when provided with input of the extrapolated function. Specifically, for the matching values in the sample, multiple field strings of different extrapolated functions may be created. The target machine learning model is executed in different execution runs using, as input, the various field strings. Based on the execution run, the accuracy and efficiency of the target machine learning model is determined. The accuracy is the ability of the target machine learning model to perform the operation of the target machine learning model. The efficiency is the speed, such as the number of compute cycles, to achieve the result. From the accuracy and efficiency, the transformation machine learning model may determine which extrapolated function is optimal and whether to modify the extrapolated function.

Thus, the extrapolated function is a transformation of the defined data type of the field. The transformation is performed in order to improve the accuracy and efficiency of the target machine learning model. FIGS. 2B and 2C show different techniques for extracting the extrapolated functions in one or more embodiments.

The extrapolated functions may be stored for the source event stream. The extrapolated function may be stored for each field and includes a definition of which fields are used as input to the extrapolated function. For example, the extrapolated function may be related in the configuration file to one or more field positions and/or to one or more attribute names. Specifically, a single extrapolated function may be stored for multiple groups of matching fields. For example, in some embodiments, information from multiple fields of the same event may be combined as input to the target machine learning model. In such a scenario, the extrapolated function defines the combination. Further, in one or more embodiments, the same attribute name and/or field positions may be mapped to multiple extrapolated functions in the configuration file. For example, if multiple pieces of information may be extracted from the same field, then each piece of information may correspond to a separate extrapolated function.

In operation 207, based on the extrapolated functions, the source event stream is transformed to obtain a transformed event stream. The transformation may be performed in batch or in real time as the source event stream is being received. Each event in the source event stream is partitioned into the values corresponding to individual fields. The fields are processed through the extrapolated functions to transform the fields to field strings. Documents and sequences may further be created using external information. As the source event stream is received and transformed, the transformed event stream is transmitted as input to the target machine learning model. Thus, because the target machine learning model is more accurate and efficient, one or more embodiments improve the accuracy and efficiency of the computer system in processing the transformed event stream.

In operation 208, the target machine learning model analyzes the transformed event stream. For example, the analysis may be to detect anomalies or detect other operations of the network.

FIGS. 2B and 2C are a flowchart diagram of a process for extrapolating an extrapolated function from a sample of a source event stream in accordance with one or more embodiments.

In operation 212, the software determines whether the field data type is a continuous variable. Determine whether the field data type is a continuous variable may be performed by determining whether the field values in the group are real numbers with at least one field value having a non-integer value. If the field value is a continuous variable, the range and distribution of values of the continuous variables of the sample are determined in operation 213. The range identifies the smallest and largest value, while the distribution identifies how the values are spread in the range. Based on the range and distribution, a probability distribution function is selected. The probability distribution function that is selected has smallest error between the probability distribution function and the values. For example, one or more regression analysis may be performed to obtain the probability distribution function. From the probability distribution function, an extrapolated function is created. In one or more embodiments, the extrapolated function groups the values of the continuous variable into buckets. In one or more embodiments, the buckets are defined to have an even distribution of values of the sample in each bucket. Each bucket is defined for a nonoverlapping sub-range of values within the range of values. For example, if the range is between 3 and 5, then the buckets are defined for subranges between 3 and 13. If the values have a uniform distribution, then the buckets have subranges of the same size (e.g., bucket A corresponds to values 3-4.99, bucket B corresponds to values 5-6.999 . . . , etc.). If the values have a normal distribution, then the subranges of the buckets match the uniform distribution (i.e., more buckets near the mean and fewer buckets toward the side of the ranges). Each bucket may further be mapped to a separate value on a different range. For example, buckets may be mapped to a percentile. The extrapolated function is mapping to the separate values.

By way of an example, a group of field values may include continuous floating point values. In such a scenario, two word-like field values having the value "value_3.14" and "value_3.142" are likely not as useful to the target machine learning model. Grouping the values into buckets corresponding to percentiles, such that both of 3.14 and 3.142 are "value_99" indicating 99th percentile may be a more meaningful "word-like field" for the target machine learning model.

Continuing with FIG. 2B, in operation 216, a determination is made whether the field data type is a limited categorical data type. For example, a limited categorical data type may be an enumerated type, where the enumerated type is not known prior to receiving the sample. Determining whether the field data type is a limited categorical data type may be performed by extracting the values of the grouping of field values from the sample and determining whether only a limited number of possible values exist.

If the field data type is a limited categorical data type, in operation 217, the categories of the sample are identified. Each unique value in the sample is a separate category. Thus, if multiple field values are "enabled," in the grouping in the sample, and remaining field values are "disabled," in the sample, then a category is created for enabled and a category is created for disabled.

Machine learning may be applied by the transformation machine learning model based on the output of the target machine learning model to generate the extrapolated function in operation 218. For example, creating an extrapolated function that transforms values into a categorical value instead of an arbitrary string or integer (e.g., "value_0" and "value_1" or "value_true" and "value_false") may be more useful to the target machine learning model. The extrapolated function may be to transform to a one hot encoding of the field data type, where each position corresponds to a category. The value of the position indicates whether the value of the field is in the category.

In operation 219, a determination is made whether the field data type is an address. For example, the address may be an internet protocol or IP address. Determining whether the field data type is an address may be performed by comparing the field data type to a regular expression. If the field data type is an address, machine learning is applied to the select an extrapolated function that transforms the address in the field in operation 220. For example, an IP address itself is an arbitrary sequence of numbers. However, the IP address may be translated to city, state, region, country, zip code, latitude, longitude, ISP, domain and or other variables that characterize the event. Thus, one or more extrapolated functions may be created for the field data type.

As shown FIG. 2B continues to FIG. 2C. In operation 221, a determination is made whether to group fields. In particular, machine learning may be applied to determine whether fields in the group of fields has significance to the machine learning model separate. If a determination is made to group fields, in operation 222, the fields are grouped. Specifically, the extrapolated function defines how to group multiple field data types based on the sample. For example, an attribute may be of type string and contain lists of key-value pairs, such as "action=LOGIN,result=PASS", in arbitrary order. Tokenizing on key-value pairs to produce word-groups like "value_action_LOGIN value_result_PASS" may result in fields that are useful to the target machine learning model. In such a scenario, the extrapolated function defines a concatenation or other grouping of field data types.

In operation 223, a determination is made whether the field data type is a time based data type. If the field data type is a time based data type, the extrapolated function may be to transform the time based data type to a uniform time based data type. A uniform time based data type is a time based data type that is uniform across fields in different groups of fields. In other words, regardless of which group the time based field belongs, the format of the time of the field is the same. Thus, a timestamp as an integer or a date or date-time combination as a string all include the same semantic information. Thus, the same extrapolated function may exist for each grouping of fields that have a time value.

If the field data type does not satisfy any criteria and should not be transformed, the flow may proceed to operation 225. In operation 225, no transformation on the field data type is saved as the extrapolated function.

Thus, once saved based on the sample of the source event stream, the extrapolated functions may be applied to the sample and the remainder of the source event stream to create a transformed event stream. By applying the extrapolated functions, the computer system is better capable of processing the event stream in order to extract information. In some cases, external information may be used to transform the source event stream. For example, a unique identifier, including an IP address, cookie identifier (id), device id, transaction id, user id and the other such identifier may not be useful to the target machine learning model as a field but may be meaningful in grouping together events into "documents" that define the behavior of the user or machine identified by identifier.

Figure 3A:
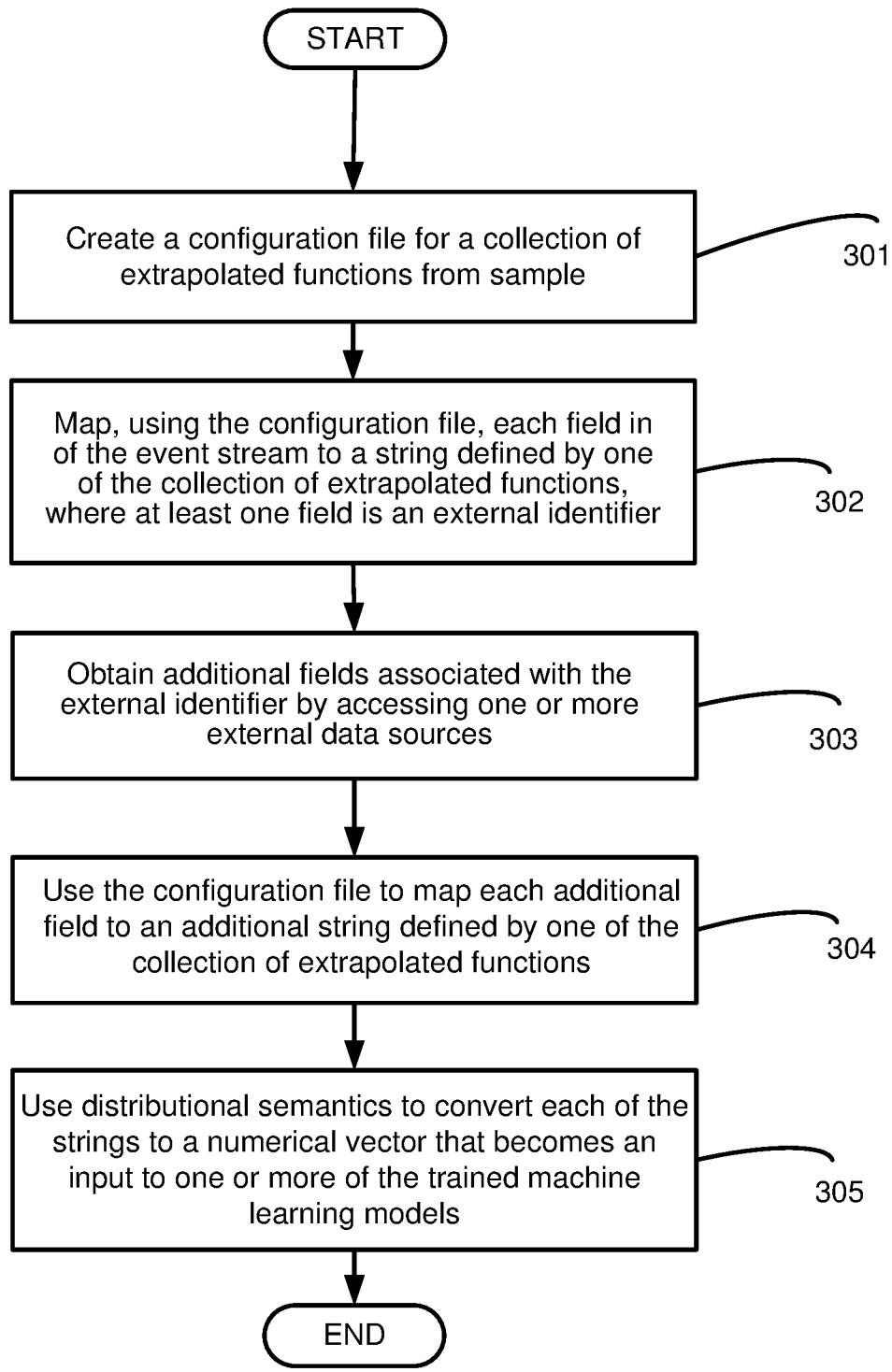
FIG. 3A is a flowchart diagram of a process for mapping a field in an event stream to a numerical vector, in accordance with one or more embodiments.

FIG. 3A is a flowchart diagram of a process for mapping a field in an event stream to a numerical vector, in accordance with one or more embodiments. In one or more embodiments, the operations shown in this figure and the other flowcharts described below might be performed by software running on servers at application services computing device using the data repository in FIGS. 1A, 1B, and 1C. In one or more embodiments, one or more of the operations shown in this flowchart and the flowcharts below might be performed on clustered computers.

As depicted in FIG. 3A, the software (e.g., the software running on servers at an application services framework) creates a configuration file for a collection of extrapolated functions that facilitate application of multiple trained machine-learning models, in operation 301. Each of the extrapolated functions corresponds to fields in an event stream defined by a schema. In operation 302, the software maps, using the configuration file, each field in an instance of the event stream to a field string defined by one of the collection of extrapolated functions. At least one field is a unique identifier, such as a user identifier or an Internet Protocol (IP) address.

In operation 303, the software obtains additional fields associated with the unique identifier by accessing one or more external data sources. For example, if the unique identifier is a user identifier, the software might obtain additional fields (e.g., age, geographic location, interests, etc.) from that user's user profile. Or if the unique identifier is an IP address, the software might obtain additional fields (e.g., the geographic location corresponding to the Internet Service Provider (ISP) associated with the IP address, the corruption index for the country containing that geographic location, the average income for that geographic location, etc.) from published data about IP addresses and geographic locations.

In operation 304, the software uses the configuration file to map each additional field to an additional field string defined by one of the collection of extrapolated functions. Then in operation 305, the software uses distributional semantics, as described above, to convert each of the field strings to a numerical vector that becomes an input to one or more of the trained machine-learning models. Examples of such trained machine-learning models are provided below.

It will be appreciated that the process described in this figure uses every field in an event stream, rather than merely the fields deemed important by a human user who, for example, might formulate a SQL "select" statement on specific columns of a database. In this way, the process discovers uncovers hidden relationships (e.g., hidden co-occurrences) between the fields in the event stream.

Figure 3B:
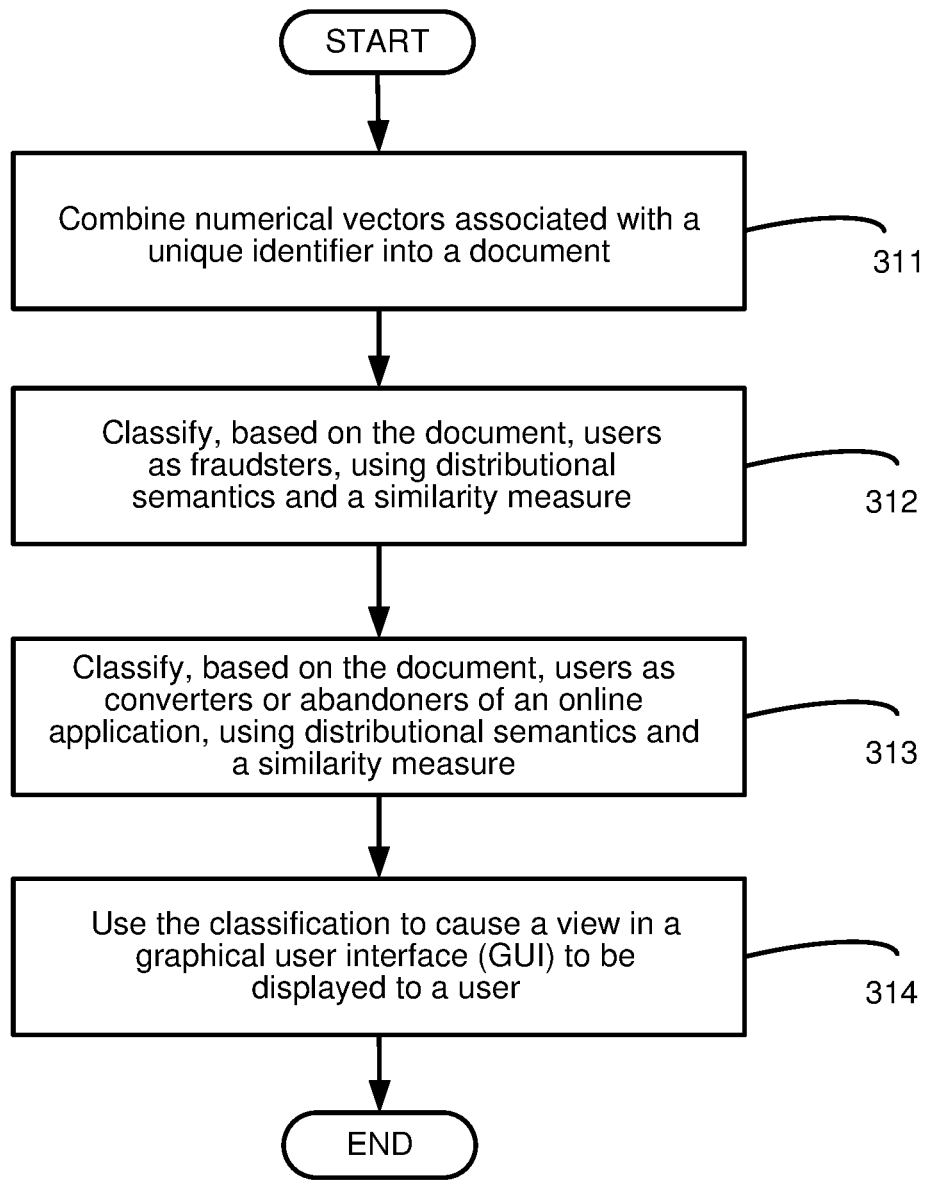
FIG. 3B is a flowchart diagram of a process for using numerical vectors with distributional semantics and a similarity measure, in accordance with one or more embodiments.

FIG. 3B is a flowchart diagram of a process for using numerical vectors with distributional semantics and a similarity measure, in accordance with one or more embodiments. In particular, FIG. 3B shows a flowchart for a target machine learning model to extract information from a transformed event stream. The operations shown in this figure might be used with the operations shown in FIG. 3A, once the numerical vectors have been generated from field strings. As depicted in FIG. 3B, the software (e.g., the software running on servers at an application services framework) combines the numerical vectors associated with a unique identifier into a document, in operation 311. The numerical vectors combined might be rows in a Hive database. In operation 312, the software classifies, based on the document, users as fraudsters, using distributional semantics and a similarity measure. In one or more embodiments, a fraudster might be user who attempts to perpetrate financial fraud against application services framework, e.g., by taking over a lawful user's financial account by hacking the computer system. Thus, the fraudster gains unauthorized access to the source computing devices in effort to extract, via the network, a user's financial account that is stored on the computing devices.

In operation 313, the software classifies, based on the document, users as converters or abandoners of an online application, using distributional semantics and a similarity measure. Then in operation 314, the software uses the classification to cause a view in a graphical user interface (GUI) to be presented to a user.

In operations 312 and 313, the software classifies users, based on the document, using distributional semantics and a similarity measure. As discussed earlier, in distributional semantics, vector space models (VSMs) represent words in a continuous vector space where semantically similar words are mapped to nearby points. Such a mapping might result from, e.g., application of Word2vec trained on the log files described above, in one or more embodiments. Then the distance between two semantically similar words or phrases might be measured using a similarity measure that operates on vectors such as cosine similarity. Alternatively, other similarity measures might be used, such as k-nearest neighbors. Then semantically similar words or phrases might be used to identify relationships between such things as indicators of high fraud risk. For example, the name of an ISP might be determined to be semantically similar to a behavior such as "Logon_Failures_99_percentile", thereby indicating that the ISP might be being used by fraudsters.

It will be appreciated that some of the semantically similar words or phrases might not be intuitive or obvious to a human observer who, for example, is formulating a SQL "select" query on database columns. For example, the name of a country with numerous fraudsters, e.g., "North Korea", might be determined to be semantically similar to "Session_Time_99_Percentile", though long session times might not have been previously considered to be an indicator of high fraud risk. As noted above, in this way, the process discovers uncovers hidden relationships (e.g., hidden co-occurrences) between the field values in the event stream.

Alternatively, application of the similarity measure to the numerical vectors might be used to create clusters using a clustering algorithm (e.g., K-means, mean-shift, Ward hierarchical, etc.), either in an unsupervised manner or a supervised manner using labels. In one or more embodiments, the clustering algorithm might be obtained from an OTS machine-learning library such as scikit-learn written in the Python programming language. Also, in one or more embodiments, the clustering algorithm might be provided by a public cloud (e.g., machine learning on Amazon AWS), rather than application services framework.

Then the resulting clusters might be used for classification. For example, if a document with a user identifier for a known fraudster ends up in a specific cluster, the other user identifiers in that cluster might be considered as having a high potential for fraud. Then when one of those users attempts to access the online application, the software might cause a GUI view to be displayed to the user denying access to the online service and providing a telephone number to call to regain access.

Outside of the fraud context, similar clusters might be used to determined whether a user will continue to use an online application. For example, a user might receive a free trial of an online product. If the user's clickstream during the free trial places the user in a cluster of users who have shown a tendency for abandoning after the free trial, the software might cause a GUI view offering a discounted purchase price to be displayed to the user. Such a discount might not be displayed to a user whose clickstream places the user in a cluster of users (e.g., converters) who have shown a tendency to purchase the online application.

Figure 3C:
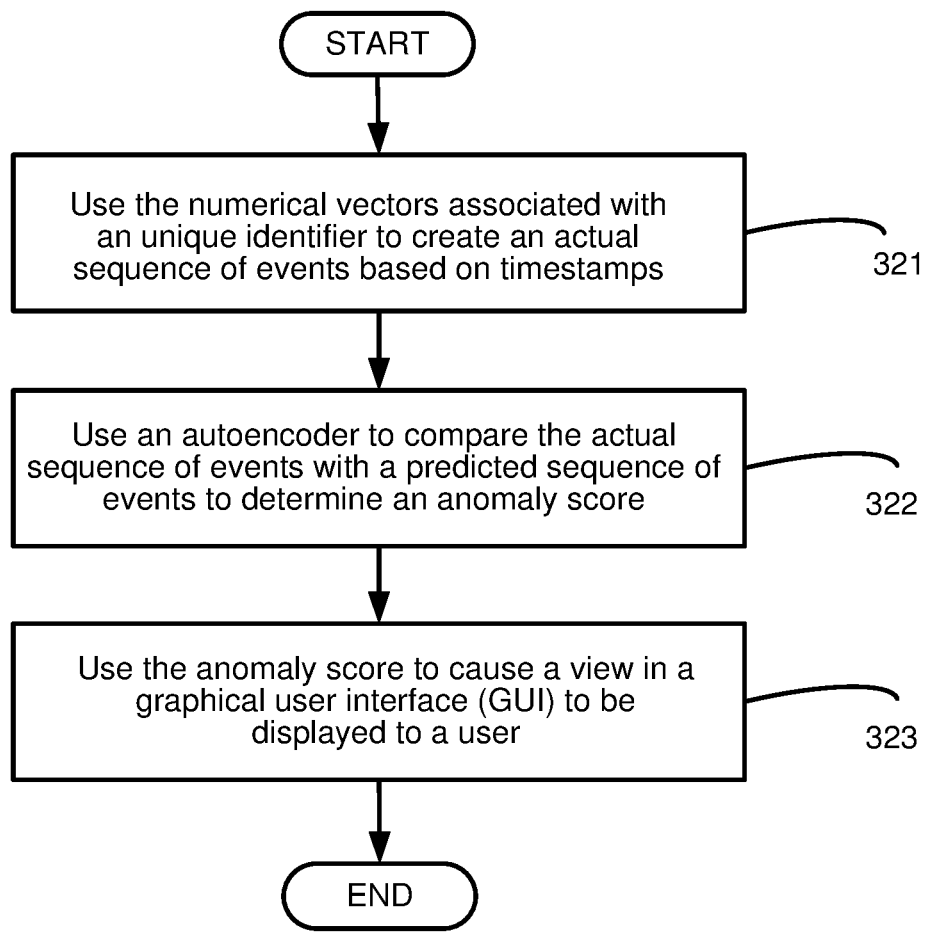
FIG. 3C is a flowchart diagram of a process for using numerical vectors with an autoencoder, in accordance with one or more embodiments.

FIG. 3C is a flowchart diagram of a process for using numerical vectors with an autoencoder, in accordance with one or more embodiments. Here again, the operations shown in this figure might be used with the operations shown in FIG. 3A, once the numerical vectors have been generated from field strings. As depicted in FIG. 3C, the software (e.g., the software running on servers at an application services framework) combines the numerical vectors associated with a unique identifier into an actual sequence of events based on timestamps, in operation 321. As noted above, the numerical vectors combined this way might be rows in a Hive database. In operation 322, the software uses an autoencoder to compare the actual sequence of events with a predicted sequence of events to determine an anomaly score. Then in operation 323, the software uses the anomaly score to cause a view in a graphical user interface (GUI) to be displayed to a user. For example, if the anomaly score is high, the software might cause a GUI view to be displayed to the user denying access to the online service and providing a telephone number to call to regain access.

In operation 322, the software uses an autoencoder to compare the actual sequence of events with a predicted sequence of events to determine an anomaly score. As used in this disclosure, an autoencoder is a neural network that is trained to attempt to copy its input to its output. Autoencoders may be thought of as being a special case of feed-forward networks and may be trained with all the same techniques, typically minibatch gradient descent following gradients computed by back-propagation.

Internally, an autoencoder has a hidden layer h that describes a code used to represent the input. The network may be viewed as consisting of two parts: an encoder function h=f(x) and a decoder that produces a reconstruction r=g(h). If an autoencoder succeeds in simply learning to set g(f(x))=x everywhere, then it is not especially useful. Instead, autoencoders are designed to be unable to learn to copy perfectly. Usually they are restricted in ways that allow them to copy only approximately, and to copy only input that resembles the training data. Because the model is forced to prioritize which aspects of the input should be copied, it often learns useful properties of the data. Copying the input to the output may sound useless, but we are typically not interested in the output of the decoder. Instead, we hope that training the autoencoder to perform the input copying task will result in h taking on useful properties. One way to obtain useful features from the autoencoder is to constrain h to have a smaller dimension than x. An autoencoder whose code dimension is less than the input dimension is called undercomplete. Learning an undercomplete representation forces the autoencoder to capture the most salient features of the training data. The learning process is described simply as minimizing the error (e.g., mean squared error) in a loss function L(x, g(f(x))), where L is a loss function penalizing g(f(x)) for being dissimilar from x.

In one or more embodiments, value the error obtained from the autoencoder might be treated as a proxy for an anomaly scored. Thus, the higher the error, the greater the anomaly score. For example, an autoencoder might be trained on numerical vectors that form an actual sequence of events tied together by a unique identifier and timestamps. Then when presented with a new numerical vector that is an actual sequence of events, the autoencoder might produce an anomaly score that is relatively high, indicating that the actual sequence of events might be indicative of potential fraud, though fraud is only one sort of anomaly and other anomalies might be innocent.

Figure 3D:
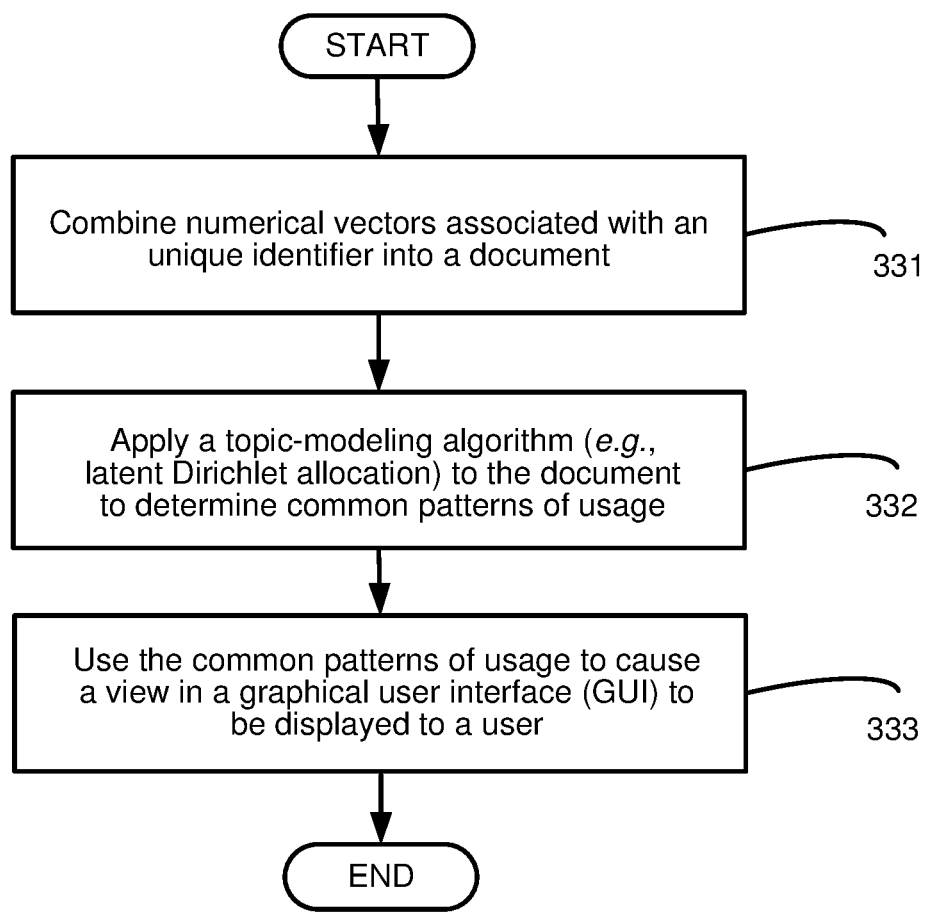
FIG. 3D is a flowchart diagram of a process for using numerical vectors with a topic-modeling algorithm, in accordance with one or more embodiments.

FIG. 3D is a flowchart diagram of a process for using numerical vectors with a topic-modeling algorithm, in accordance with one or more embodiments. The operations shown in this figure might be used with the operations shown in FIG. 3A, once the numerical vectors have been generated from field strings. As depicted in FIG. 3D, the software (e.g., the software running on servers at an application services framework) combines the numerical vectors associated with a unique identifier into a document, in operation 331.

In operation 332, the software applies a topic-modeling algorithm (e.g., latent Dirichlet allocation) to the document to determine common patterns of usage. Then in operation 333, the software uses the common patterns of usage to cause a view in a graphical user interface (GUI) to be displayed to a user. For example, if the common patterns of usage indicate that a user might be a fraudster, the software might cause a GUI view to be displayed to the user denying access to the online service and providing a telephone number to call to regain access.

In operation 332, the software applies a topic-modeling algorithm to the document to determine common patterns of usage. In one or more embodiments, the topic-modeling algorithm might be latent Dirichlet allocation (LDA). LDA is a generative statistical model for text clustering based on a "bag-of-words" assumption, namely, that within a document, words are exchangeable and therefore the order of words in a document may be disregarded. Further, according to this assumption, the documents within a corpus are also exchangeable and therefore the order of documents within a corpus may be disregarded. Proceeding from this assumption, LDA uses various probability distributions (Poisson, Dirichlet, and/or multinomial) to extract sets of co-occurring words from a corpus of documents to form topics. As indicated above, the corpus might consist of a collection of databases, logfiles, and/or streams, in one or more embodiments. For example, a topic derived from such a corpus might include words or phrases such as "North Korea" and "Logon_Failures_99_percentile", thereby indicating that an ISP identifier is associated with a high potential for fraud.

Figure 3E:
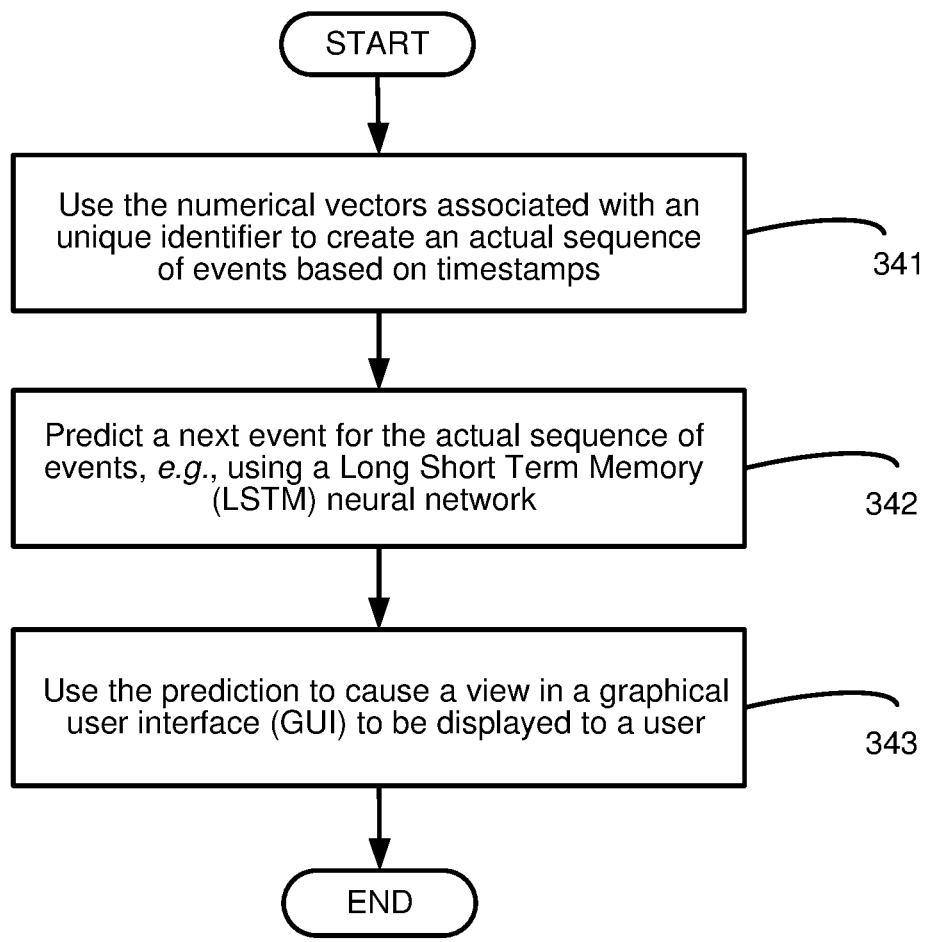
FIG. 3E is a flowchart diagram of a process for using numerical vectors with a recurrent neural-network algorithm, in accordance with one or more embodiments.

FIG. 3E is a flowchart diagram of a process for using numerical vectors with a recurrent neural-network algorithm, in accordance with one or more embodiments. As depicted in FIG. 3E, the software (e.g., the software running on servers at an application services framework) combines the numerical vectors associated with a unique identifier into an actual sequence of events based on timestamps, in operation 341. In operation 342, the software predicts a next event for the actual sequence of events, e.g., using a Long Short Term Memory (LSTM) recurrent neural network. In operation 333, the software uses the prediction to cause a view in a graphical user interface (GUI) to be displayed to a user. For example, if the prediction indicates that a user might be attempting an account takeover, the software might cause a GUI view to be displayed to the user denying access to the online service and providing a telephone number to call to regain access.

In operation 342, the software predicts a next event for the actual sequence of events. In one or more embodiments, this prediction might be made using a LSTM recurrent neural network. In a traditional recurrent neural network, during the gradient back-propagation phase, the gradient signal can end up being multiplied a large number of times (as many as the number of timesteps) by the weight matrix associated with the connections between the neurons of the recurrent hidden layer. The magnitude of weights in the transition matrix can have a strong impact on the learning process. If the weights in this matrix are small, the small weights may lead to a situation called vanishing gradients where the gradient signal gets so small that learning either becomes very slow or stops working altogether. Small weights can also make more difficult the task of learning long-term dependencies in the data. Conversely, if the weights in this matrix are large, the large weights may lead to a situation where the gradient signal is so large that it can cause learning to diverge. The large weights may be referred to as exploding gradients.

LSTM recurrent neural network may be used and introduces a new structure called a memory cell. A memory cell includes four main elements: an input gate, a neuron with a self-recurrent connection (a connection to itself), a forget gate and an output gate. The self-recurrent connection ensures that, barring any outside interference, the state of a memory cell can remain constant from one timestep to another. The gates serve to modulate the interactions between the memory cell itself and its environment. The input gate can allow incoming signal to alter the state of the memory cell or block it. On the other hand, the output gate can allow the state of the memory cell to have an effect on other neurons or prevent it. Finally, the forget gate can modulate the memory cell's self-recurrent connection, allowing the cell to remember or forget its previous state, as needed. The output of the LSTM recurrent neural network can be fed to a predictive classifier whose target is the class label associated with the input sequence. So, for example, the input sequence might be the actual sequence of events associated with a unique identifier and timestamps. And the resulting class label, as predicted by the predictive classifier, might be "potential fraud attempt".

The following use case is for explanatory purposes only and not intended to limit the scope described herein.

A fraud researcher for an online application generates a collection of generic extrapolated functions that can be used to convert the database column values into numeric vectors for input into a number of machine-leaning algorithms and stores the generic extrapolated functions in a configuration file. The fraud researcher obtains clickstreams for the users of the online application in the form of Hive databases and applies the extrapolated functions to them to obtain sequences of numeric vectors, each of which is based on user identifier and timestamps. Then the fraud researcher uses the sequences to train an autoencoder which outputs anomaly scores. The fraud researcher receives a clickstream for a new user and converts it into a similar sequence of numeric vectors using the generic extrapolated functions in the configuration file. When the fraud researcher inputs the new sequence in the trained autoencoder, the autoencoder outputs a relatively high anomaly score and the fraud researchers identifies the new user as a "potential fraudster".

Figure 4A:
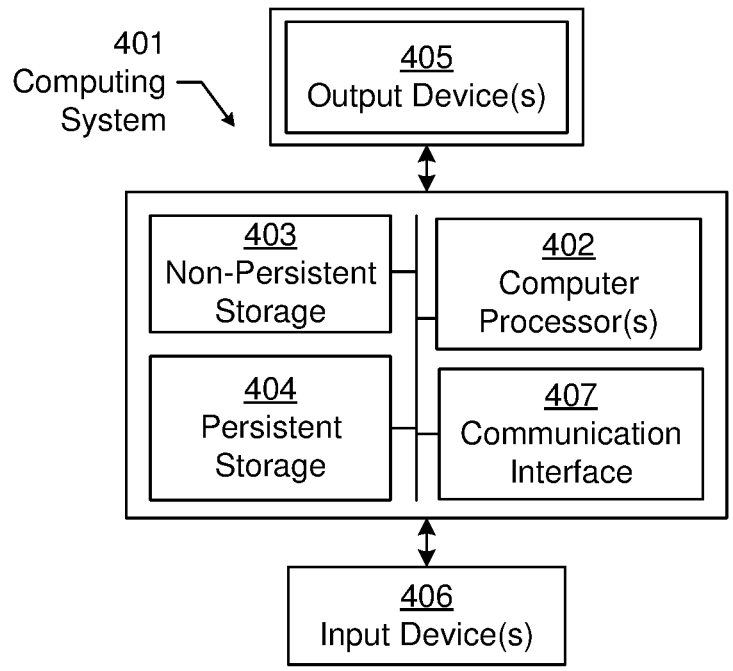
FIGS. 4A and 4B are diagrams showing a computing system, in accordance with one or more embodiments of the disclosure.
Figure 4B:
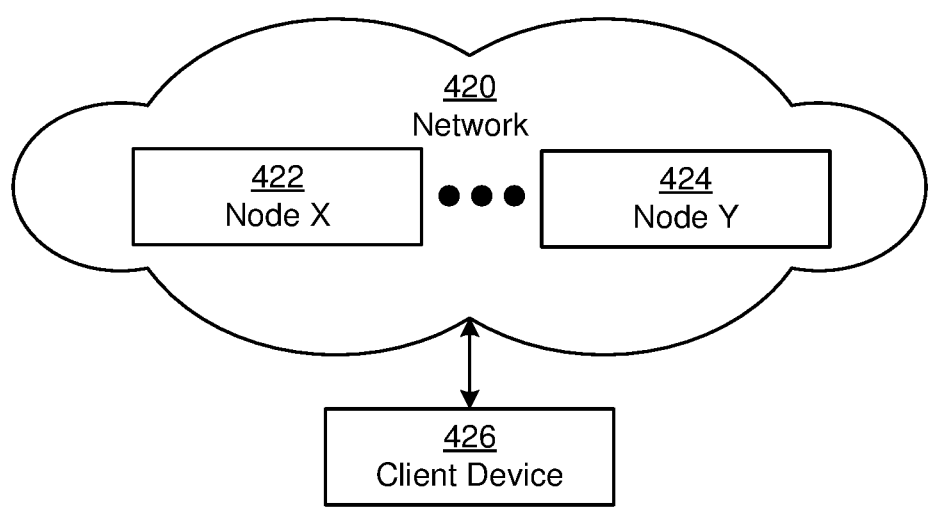

Embodiments of the disclosure may be implemented on a computing system. Any combination of mobile, desktop, server, embedded, or other types of hardware may be used. FIGS. 4A and 4B are diagrams showing a computing system, in accordance with one or more embodiments of the disclosure. As shown in FIG. 4A, the computing system (401) may include one or more computer processor(s) (402), associated memory (403) (e.g., random access memory (RAM), cache memory, flash memory, etc.), one or more storage device(s) (404) (e.g., a hard disk, an optical drive such as a compact disk (CD) drive or digital versatile disk (DVD) drive, a flash memory stick, etc.), and numerous other elements and functionalities such as communication interface (407). The computer processor(s) (402) may be an integrated circuit for processing instructions. For example, the computer processor(s) may be one or more cores, or micro-cores of a processor. The computing system (401) may also include one or more input device(s) (406), such as a touchscreen, keyboard, mouse, microphone, touchpad, electronic pen, or any other type of input device. Further, the computing system (401) may include one or more output device(s) (405), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (401) may be connected to a network (420) (e.g., a local area network (LAN), a wide area network (WAN) such as the Internet, mobile network, or any other type of network) via a network interface connection (not shown). The input and output device(s) may be locally or remotely (e.g., via the network 420) connected to the computer processor(s) (402), memory (403), and storage device(s) (404). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure.

Further, one or more elements of the aforementioned computing system (401) may be located at a remote location and connected to the other elements over a network (420). Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the disclosure.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 4A and the nodes and/or client device in FIG. 4B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   establishing a network connection with a source computing device and an application services computing device;
   receiving, via the network connection, a source event stream at the application services computing device;
   extracting a sample of the source event stream;
   partitioning the sample of the source event stream into a plurality of fields;
   identifying a field data type of a field of the plurality of fields in the sample;
   identifying a distribution of a plurality of values of the field in the sample;
   extrapolating, from the sample of the source event stream, a plurality of extrapolated functions for the plurality of fields, wherein extrapolating an extrapolated function in the plurality of extrapolated functions is dependent on the field data type and the distribution of the field;
   transforming, based on the plurality of extrapolated functions in the configuration file, the source event stream to obtain a transformed event stream; and analyzing, by a target machine learning model, the transformed event stream.

2. The method of claim 1, further comprising:
identifying a range of the plurality of values in the sample;
selecting a probability distribution function based on the range and the distribution; and
creating the extrapolated function using the probability distribution function.

3. The method of claim 1, further comprising:
identifying a plurality of categories in the sample; and
applying machine learning to the plurality of categories based on an output of the target machine learning model to generate the extrapolated function.

4. The method of claim 1, further comprising:
applying machine learning to define the extrapolated function for transforming an address in the field.

5. The method of claim 1, further comprising:
extrapolating an extrapolated function that groups a plurality of field data types based on a sample.

6. The method of claim 1, further comprising:
selecting a uniform time based data type as the extrapolated function.

7. The method of claim 1, further comprising:
mapping, using the configuration file, each field in the source event stream to a string defined by one of the plurality of extrapolated functions, wherein at least one field is an external identifier to obtain a plurality of strings; and
using distributional semantics to convert each of the plurality of strings to a numerical vector that becomes an input to the target machine learning model.

8. The method of claim 7, further comprising:
obtaining an additional field associated with the external identifier by accessing an external data source;
mapping, using the configuration file, each additional field to an additional string defined by at least one of the plurality of extrapolated functions; and
converting, using distributional semantics, each of the additional strings to an additional numerical vector that becomes an input to the target machine learning model.

9. The method of claim 7, further comprising:
combining a plurality of numerical vectors associated with the external identifier into a document; and
applying a topic-modeling algorithm to the document to determine a common pattern of usage.

10. The method of claim 7, further comprising:
combining a plurality of numerical vectors associated with the external identifier into a document; and
classifying, based on the document, a plurality of users as fraudsters, converters, or abandoners, using distributional semantics and a similarity measure.

11. The method of claim 7, further comprising:
using the numerical vectors associated with the external identifier to create an actual sequence of events; and
using an auto-encoder to compare the actual sequence of events with a predicted sequence of events to determine an anomaly score.

12. A system, comprising:
a hardware processor and memory; and
software instructions stored in the memory, which when executed by the hardware processor, cause the hardware processor to:
establish a network connection with a source computing device and an application services computing device,
receive, via the network connection, a source event stream at the application services computing device,
extract a sample of the source event stream,
partition the sample of the source event stream into a plurality of fields,
identify a field data type of a field of the plurality of fields in the sample;
identify a distribution of a plurality of values of the field in the sample;
extrapolate, from the sample of the source event stream, a plurality of extrapolated functions for the plurality of fields, wherein extrapolating an extrapolated function in the plurality of extrapolated functions is dependent on the field data type and the distribution of the field,
transform, based on the plurality of extrapolated functions in the configuration file, the source event stream to obtain a transformed event stream, and
analyze, by a target machine learning model, the transformed event stream.

13. The system of claim 12, further comprising:
a data repository for storing a plurality of field strings.

14. A non-transitory computer readable medium comprising computer readable program code for:
establishing a network connection with a source computing device and an application services computing device;
receiving, via the network connection, a source event stream at the application services computing device;
extracting a sample of the source event stream;
partitioning the sample of the source event stream into a plurality of fields;
identifying a field data type of a field of the plurality of fields in the sample;
identifying a distribution of a plurality of values of the field in the sample;
extrapolating, from the sample of the source event stream, a plurality of extrapolated functions for the plurality of fields, wherein extrapolating an extrapolated function in the plurality of extrapolated functions is dependent on the field data type and the distribution of the field;
store, in a configuration file for the source event stream, the plurality of extrapolated functions;
transform, based on the extrapolated functions in the configuration file, the source event stream to obtain a transformed event stream; and
analyze, by a target machine learning model, the transformed event stream.

15. The non-transitory computer readable medium of claim 12, further comprising computer readable program code for:
identifying a range of the plurality of values in the sample;
selecting a probability distribution function based on the range and the distribution; and
creating the extrapolated function using the probability distribution function.

16. The non-transitory computer readable medium of claim 12, further comprising computer readable program code for:
identifying a plurality of categories in the sample; and
applying machine learning to the plurality of categories based on an output of the target machine learning model to generate the extrapolated function.

17. The non-transitory computer readable medium of claim 12, further comprising computer readable program code for:
applying machine learning to define the extrapolated function for transforming an address in the field.

18. The non-transitory computer readable medium of claim 12, further comprising computer readable program code for:
   extrapolating the extrapolated function that groups a plurality of field data types based on a sample.

19. The non-transitory computer readable medium of claim 12, further comprising computer readable program code for:
   extrapolating the extrapolated function that maps a first time based data type to a uniform time based data type.

20. The non-transitory computer readable medium of claim 12, further comprising computer readable program code for:
   mapping, using the configuration file, each field in the source event stream to a string defined by one of the plurality of extrapolated functions, wherein at least one field is an external identifier to obtain a plurality of strings; and
   using distributional semantics to convert each of the plurality of strings to a numerical vector that becomes an input to the target machine learning model.

\* \* \* \* \*